(12) United States Patent
D'Agruma et al.

(10) Patent No.: US 8,745,148 B1
(45) Date of Patent: *Jun. 3, 2014

(54) METHODS AND SYSTEMS FOR WEB AND CALL PROCESSING

(71) Applicant: Callwave Communications, LLC, Santa Barbara, CA (US)

(72) Inventors: Daniel D'Agruma, Williamstown, MA (US); Chris Phillips, Santa Barbara, CA (US); Nicholas Burwell, Goleta, CA (US); Loren Bland, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,225

(22) Filed: Nov. 6, 2013

Related U.S. Application Data

(63) Continuation of application No. 12/125,746, filed on May 22, 2008, now Pat. No. 8,583,746.

(60) Provisional application No. 60/940,358, filed on May 25, 2007.

(51) Int. Cl.
   *G06F 15/16* (2006.01)
   *H04M 3/42* (2006.01)

(52) U.S. Cl.
   USPC .......................... 709/206; 709/217; 455/417

(58) Field of Classification Search
   None
   See application file for complete search history.

(56) References Cited

U.S. PATENT DOCUMENTS

| | | | |
|---|---|---|---|
| 3,936,613 | A | 2/1976 | Nishigori et al. |
| 3,956,595 | A | 5/1976 | Sobanski |
| 4,009,337 | A | 2/1977 | Sakai et al. |
| 4,022,983 | A | 5/1977 | Braun et al. |
| 4,485,470 | A | 11/1984 | Reali |

(Continued)

FOREIGN PATENT DOCUMENTS

| | | |
|---|---|---|
| CA | 1329852 | 9/1989 |
| EP | 1120954 | 8/2001 |

(Continued)

OTHER PUBLICATIONS (2006) "Entrepreneur of the Year awards—benchmark to the global economy," *The Business Magazine* (*Thames Valley*), Web Site: http://www.eoy.co.uk.

(Continued)

*Primary Examiner* — Ranodhi Serrao
(74) *Attorney, Agent, or Firm* — Knobbe, Martens, Olson & Bear LLP

(57) ABSTRACT

Communication systems and methods are described. In an illustrative embodiment, embeddable code is provided to a user to embed on a user web page. A communication request is received from a visitor via a user interface displayed on the user web page, the user interface including an address field configured to receive from the visitor an address associated with the visitor, and a text entry field configured to receive a text message from the visitor, wherein the user interface is generated at least in part by the code. If the visitor enters a phone address into the address field, a determination is made as to whether the phone address is valid at least partly in response to a first action by the visitor. If the visitor enters text into the text entry field, the text is transmitted to the user at least partly in response to a second action by the visitor.

27 Claims, 10 Drawing Sheets

(56) References Cited

U.S. PATENT DOCUMENTS

| | | |
|---|---|---|
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,407 A | 6/1996 | Russell et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,619,708 A | 4/1997 | Ho |
| 5,640,677 A | 6/1997 | Karlsson |
| 5,651,054 A | 7/1997 | Dunn et al. |
| 5,668,861 A | 9/1997 | Watts |
| 5,668,928 A | 9/1997 | Groner |
| 5,729,741 A | 3/1998 | Liaguno et al. |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,333,973 B1 | 12/2001 | Smith et al. |
| 6,350,066 B1 | 2/2002 | Bobo, II |
| 6,353,660 B1 | 3/2002 | Burger et al. |
| 6,353,663 B1 | 3/2002 | Stevens et al. |
| 6,356,662 B1 | 3/2002 | Tsai |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,442,250 B1 | 8/2002 | Troen-Krasnow et al. |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,507,643 B1 | 1/2003 | Groner |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,606,373 B1 | 8/2003 | Martin |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,687,340 B1 | 2/2004 | Goldberg et al. |
| 6,690,785 B1 | 2/2004 | Stelter et al. |
| 6,751,297 B2 | 6/2004 | Nelkenbaum |
| 6,751,299 B1 | 6/2004 | Brown et al. |
| 6,775,370 B2 | 8/2004 | Burg |
| 6,775,651 B1 | 8/2004 | Lewis et al. |
| 6,782,088 B1 | 8/2004 | Gabara |
| 6,785,021 B1 | 8/2004 | Gordon et al. |
| 6,792,094 B1 | 9/2004 | Kirkpatrick |
| 6,804,334 B1 | 10/2004 | Beasley et al. |
| 6,813,603 B1 | 11/2004 | Groner et al. |
| 6,857,074 B2 | 2/2005 | Bobo, II |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,058,573 B1 | 6/2006 | Murveit et al. |
| 7,065,186 B1 | 6/2006 | Myers et al. |
| 7,085,716 B1 | 8/2006 | Even et al. |
| 7,103,154 B1 | 9/2006 | Cannon et al. |
| 7,136,462 B2 | 11/2006 | Pelaez et al. |
| 7,170,978 B2 | 1/2007 | Idren |
| 7,191,135 B2 | 3/2007 | O'Hagan |
| 7,206,389 B1 | 4/2007 | Dumoulin et al. |
| 7,209,964 B2 | 4/2007 | Dugan et al. |
| 7,302,539 B2 | 11/2007 | Korgaonkar et al. |
| 7,310,601 B2 | 12/2007 | Nishizaki et al. |
| 7,316,354 B2 | 1/2008 | Davis |
| 7,319,742 B2 | 1/2008 | Levine |
| 7,324,939 B1 | 1/2008 | Cardillo et al. |
| 7,324,940 B1 | 1/2008 | Miller et al. |
| 7,324,943 B2 | 1/2008 | Rigazio et al. |
| 7,327,696 B1 | 2/2008 | Yarlagadda |
| 7,327,723 B2 | 2/2008 | Kurganov |
| 7,369,653 B2 | 5/2008 | Dezonno et al. |
| 7,388,949 B2 | 6/2008 | Contractor et al. |
| 7,412,050 B2 | 8/2008 | Renner et al. |
| 7,647,350 B2 | 1/2010 | Parkinson et al. |
| 7,702,792 B2 | 4/2010 | Shaffer et al. |
| 7,716,186 B2 | 5/2010 | Cannon |
| 7,826,605 B1 | 11/2010 | Vanier et al. |
| 7,903,795 B2 | 3/2011 | Hiatt et al. |
| 7,979,403 B2 | 7/2011 | Kedem et al. |
| 8,208,796 B2 | 6/2012 | Prus |
| 8,214,338 B1 | 7/2012 | Kirchhoff et al. |
| 8,325,886 B1 | 12/2012 | Kirchhoff et al. |
| 2002/0010616 A1 | 1/2002 | Itzhaki |
| 2002/0097710 A1 | 7/2002 | Burg |
| 2002/0176548 A1 | 11/2002 | Watts |
| 2003/0016792 A1 | 1/2003 | Skladman et al. |
| 2003/0026393 A1 | 2/2003 | Skladman et al. |
| 2003/0039339 A1 | 2/2003 | Luehrig et al. |
| 2003/0063731 A1 | 4/2003 | Woodring |
| 2003/0123629 A1 | 7/2003 | Hussain et al. |
| 2003/0142807 A1 | 7/2003 | Dolan et al. |
| 2003/0156700 A1 | 8/2003 | Brown et al. |

(56) References Cited

U.S. PATENT DOCUMENTS

| | | |
|---|---|---|
| 2003/0220784 A1 | 11/2003 | Fellenstein et al. |
| 2004/0028203 A1 | 2/2004 | Wurster et al. |
| 2004/0076272 A1 | 4/2004 | Zafar et al. |
| 2004/0105536 A1 | 6/2004 | Williams |
| 2004/0190703 A1 | 9/2004 | Trandal et al. |
| 2004/0190706 A1 | 9/2004 | Fleischer, III et al. |
| 2004/0240641 A1 | 12/2004 | Cohen et al. |
| 2004/0252679 A1 | 12/2004 | Williams et al. |
| 2004/0258220 A1 | 12/2004 | Levine et al. |
| 2005/0013419 A1 | 1/2005 | Pelaez et al. |
| 2005/0053216 A1 | 3/2005 | Spencer et al. |
| 2005/0123118 A1 | 6/2005 | Terry et al. |
| 2005/0129206 A1 | 6/2005 | Martin |
| 2005/0136955 A1 | 6/2005 | Mumick et al. |
| 2005/0141678 A1 | 6/2005 | Anders |
| 2005/0171936 A1 | 8/2005 | Zhu |
| 2005/0207556 A1 | 9/2005 | Gonzalez et al. |
| 2005/0265322 A1 | 12/2005 | Hester |
| 2005/0288005 A1 | 12/2005 | Roth et al. |
| 2006/0013374 A1 | 1/2006 | Fleischer, III et al. |
| 2006/0045255 A1 | 3/2006 | Peters et al. |
| 2006/0058052 A1 | 3/2006 | Plestid et al. |
| 2006/0141962 A1 | 6/2006 | Forbes et al. |
| 2006/0143307 A1 | 6/2006 | Codignotto |
| 2006/0168015 A1 | 7/2006 | Fowler |
| 2006/0172749 A1 | 8/2006 | Sweeney |
| 2006/0223502 A1 | 10/2006 | Doulton |
| 2006/0234680 A1 | 10/2006 | Doulton |
| 2006/0256934 A1 | 11/2006 | Mazor |
| 2007/0054678 A1 | 3/2007 | Doulton |
| 2007/0093255 A1 | 4/2007 | Nurminen et al. |
| 2007/0116194 A1 | 5/2007 | Agapi et al. |
| 2007/0116204 A1 | 5/2007 | Doulton |
| 2007/0117543 A1 | 5/2007 | Doulton |
| 2007/0117544 A1 | 5/2007 | Doulton |
| 2007/0117545 A1 | 5/2007 | Doulton |
| 2007/0117546 A1 | 5/2007 | Doulton |
| 2007/0117547 A1 | 5/2007 | Doulton |
| 2007/0118357 A1 | 5/2007 | Kasravi et al. |
| 2007/0126875 A1 | 6/2007 | Miyamaki |
| 2007/0127638 A1 | 6/2007 | Doulton |
| 2007/0127657 A1 | 6/2007 | Shaffer et al. |
| 2007/0127688 A1 | 6/2007 | Doulton |
| 2007/0183405 A1 | 8/2007 | Bennett |
| 2007/0217579 A1 | 9/2007 | Sobti et al. |
| 2007/0245024 A1 | 10/2007 | Prus |
| 2007/0274465 A1 | 11/2007 | Othmer |
| 2007/0280434 A1 | 12/2007 | Howell et al. |
| 2008/0040673 A1 | 2/2008 | Zuckerberg et al. |
| 2008/0076409 A1 | 3/2008 | Hinrikus et al. |
| 2008/0081662 A1 | 4/2008 | Strandell et al. |
| 2008/0109422 A1 | 5/2008 | Dedhia |
| 2008/0152101 A1 | 6/2008 | Griggs |
| 2008/0177786 A1 | 7/2008 | Faisman et al. |
| 2008/0178225 A1 | 7/2008 | Jost |
| 2008/0229048 A1 | 9/2008 | Murase et al. |
| 2009/0067586 A1 | 3/2009 | Fano et al. |
| 2011/0113343 A1 | 5/2011 | Trauth |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

OTHER PUBLICATIONS (2007) "Leave your text message after the beep . . . ," FT.com *Financial Times*.

Grenville, Mike (2006) "News: Mobile wins startup awards, 82ASK and Spinvox have both won Start Up Awards," *160Characters SMS & Mobile Messaging Association*.

Holahan, Catherine (2007) "The twitterization of blogs," *Business Week*.

Johnson, Dave; Article; "Now You're Talking—voice—response systems for home offices—Product Information"; http://www.findarticles.com; Feb. 1999.

La Monica, Paul R. (2007) "Leave your blog after the beep," CNNMoney.com, *Media Biz*.

Lee, Maggie (2006) "Not all talk: A strong coffee with the founders of speech-to-text telecom *Spinvox*," *European Business*.

Office Action for U.S. Appl. No. 11/971,097, mailed Mar. 29, 2011.
Office Action for U.S. Appl. No. 12/046,305, mailed Jan. 13, 2012.
Office Action for U.S. Appl. No. 12/046,305, mailed Feb. 9, 2011.
Office Action for U.S. Appl. No. 12/046,305, mailed Sep. 1, 2011.
Office Action for U.S. Appl. No. 12/113,733, mailed Dec. 10, 2010.

Shannon, Victoria (2007) "The End User: A voice for the consumer, Speaking up to get online," *International Herald Tribune*, Web Site: http://www.iht.com.

Wides, Cara, "A new spin on messaging," *Spotlight*.

AD

GET YOUR TEXT ON

Personalize now to send your message.   Terms of Service

Mobile Number

Select Country ▼

Email

Already Personalized?   ☑ Remember me   Submit

*FIG. 8B*

METHODS AND SYSTEMS FOR WEB AND CALL PROCESSING

CROSS-REFERENCE TO RELATED APPLICATIONS

This application is a continuation of U.S. application Ser. No. 12/125,746, filed May 22, 2008, which claims priority from U.S. Patent Application No. 60/940,358, filed May 25, 2007, the content of which is incorporated by reference herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for web and call processing.

2. Description of the Related Art

Thirty years ago the predominant form of remote interactive communications was over the Public Switched Telecommunications Network. Remote communications has evolved dramatically since. Now individuals often communicate using wireline and wireless phones, email, text messaging, and through web sites.

SUMMARY OF THE INVENTION

The present invention is related to telecommunications, and in particular, to methods and systems for message processing.

Example embodiments provide Web-based visitors to social networking sites with methods and systems for getting in touch with Web-based "owner's" of a profile page, without having to know or type the owner's phone number into their phone. In addition, certain example embodiments provide a more dynamic and different medium than writing a comment on the page owner's profile page.

An example embodiment provides a method of providing online communication, the method comprising: causing at least in part the code embeddable on a user web page to be provided to a user; receiving from a visitor a communication request via a user interface displayed on the user web page, the user interface including an address field configured to receive from the visitor an address associated with the visitor, and a text entry field configured to receive a text message from the visitor for the user, wherein the user interface is generated at least in part by the code; if the visitor enters a phone address into the address field, determining if the entered phone address is valid at least partly in response to a first action by the visitor; and if the visitor enters text into the text entry field, transmitting the text to the user at least partly in response to a second action by the visitor.

An example embodiment provides a method of providing online communication, the method comprising: receiving from a visitor a communication request via a user interface displayed on a user web page, the user interface including an address field configured to receive from the visitor an address associated with the visitor, and a text entry field configured to receive a text message from the visitor for the user; if the visitor enters a valid phone address into the address field and activates at least a first control, at least partly causing a call to be placed to the phone address, wherein the visitor is provided the opportunity to record a voice message for the user; and if the visitor enters text into the text entry field, transmitting the text to the user at least partly in response to a first action by the visitor.

An example embodiment provides a method of providing online communication, the method comprising: receiving from a visitor a communication request via a user interface displayed on a user web page, the user interface including an address field configured to receive from the visitor an address associated with the visitor; and at least partly in response to a first visitor action, at least partly causing a call to be placed to a phone address entered into the address field, wherein the visitor is provided via the call the opportunity to record a voice message for the user.

An example embodiment provides program code stored in computer readable memory comprising code configured to: receive from a visitor a communication request via a user interface displayed on a user web page being accessed by the visitor, the user interface including an address field configured to receive from the visitor an address associated with the visitor; and at least partly in response to a first visitor action, at least partly cause a call to be placed to a phone address entered into the address field, wherein the visitor is provided via the call the opportunity to record a voice message for the user.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 8A-C illustrates an example Widget via which a text message can be left.

DETAILED DESCRIPTION OF PREFERRED EMBODIMENTS

Figure 1:
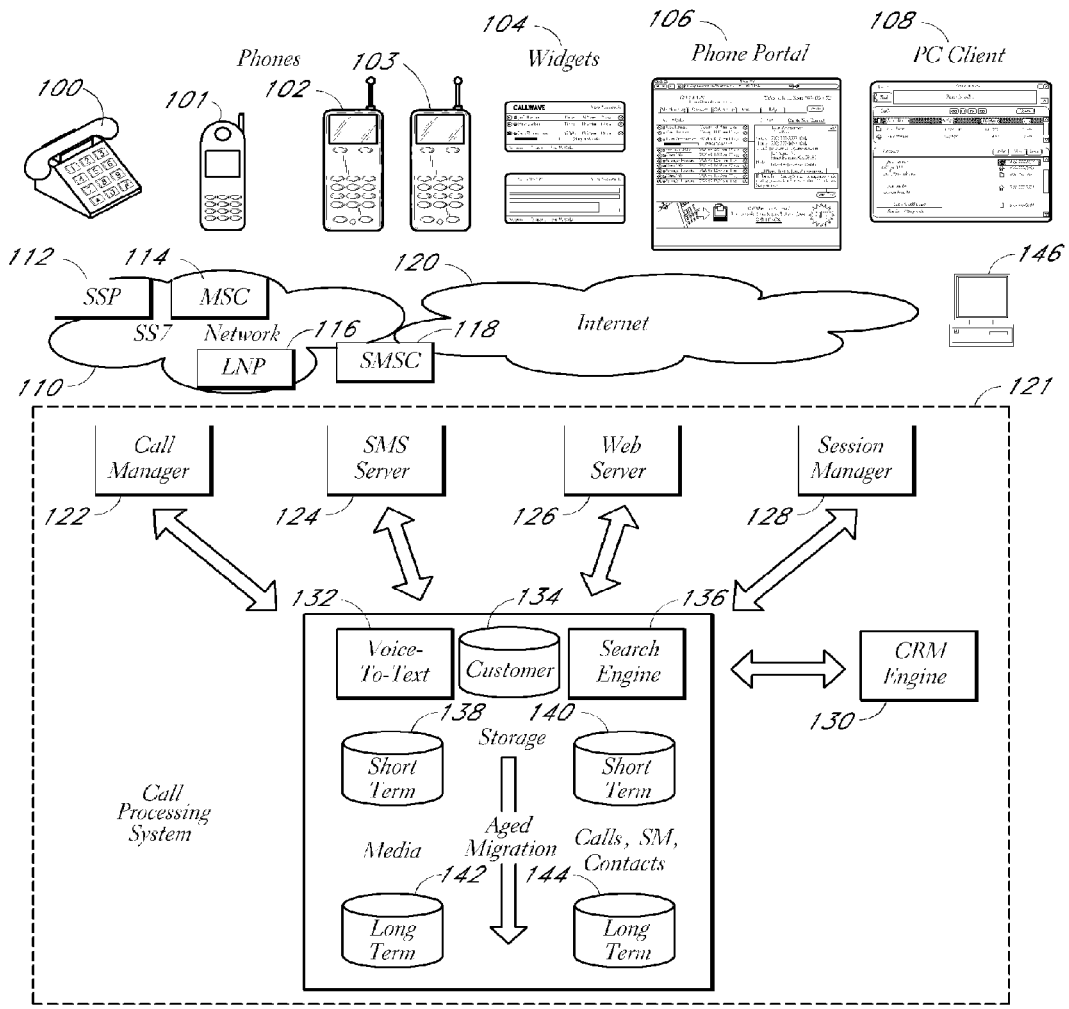
FIG. 1 illustrates an example network operating environment for advanced telecommunications services.

The present invention is related to telecommunications, and in particular, to methods and systems for web and call processing.

As noted above, telecommunications has evolved dramatically in recent years. As more individuals rely on the World Wide Web (Web) for communications, there is a need to seamlessly integrate Web interactions with conventional telecommunication networks and services. Described herein are example embodiments of methods and systems which enable a user to leave a message via a web page, such as in a social networking environment (e.g., via a device, such as a widget implanted via software code referred to as a Leave Message Widget (LMW)). For example, the LMW enables a visitor of a Web page to request that a voice mail system call the visitor so that the visitor can record a voice mail for another user.

Example embodiments provide Web-based visitors to social networking sites with methods and systems for getting in touch with Web-based "owner's" of a profile page, without having to know or type the owner's phone number into their phone. In addition, certain example embodiments provide a more dynamic and different medium than writing a comment on the page owner's profile page.

Integrating Web-based user communication services as described herein can increase the attractiveness and value to the subscriber of the service provider's telecommunications service offering.

Certain embodiments of a call processing system described herein provide call and message services. Such services may optionally be provided using condition monitors/triggers, such as SS7 Advanced Intelligent Network (AIN) triggers (or other event detection mechanism). In an example embodiment, to support this service, the service provider configures a trigger at the appropriate points in an inbound and/or outbound call for a customer/subscriber. In an example embodiment, when a certain trigger fires, a call processing system (e.g., acting as a Service Control Point (SCP) in the SS7 network, and connecting calls from one phone line to another, using, for example, software running on a computer system), receives a query that enables the call processing system to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. Various features of the embodiments described herein can be combined.

Further, while the following description refers to example network and telephony standards and protocols, other standards and protocols can be used as well. The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well. While certain phone addresses are referenced for purposes of illustration, other electronic addresses or locators can be used as well.

In addition, while reference may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone (e.g., with an operating system and on which a user can install applications) and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

While certain descriptions refer to example messaging protocols (e.g., SMS or MMS) for illustrative purposes, other messaging protocols can be used as well (e.g., instant messaging, email, etc.). While certain examples refer to the utilization of HTML code, other code can be used as well (e.g., XML, SGML, Java, etc.).

Figure 2:
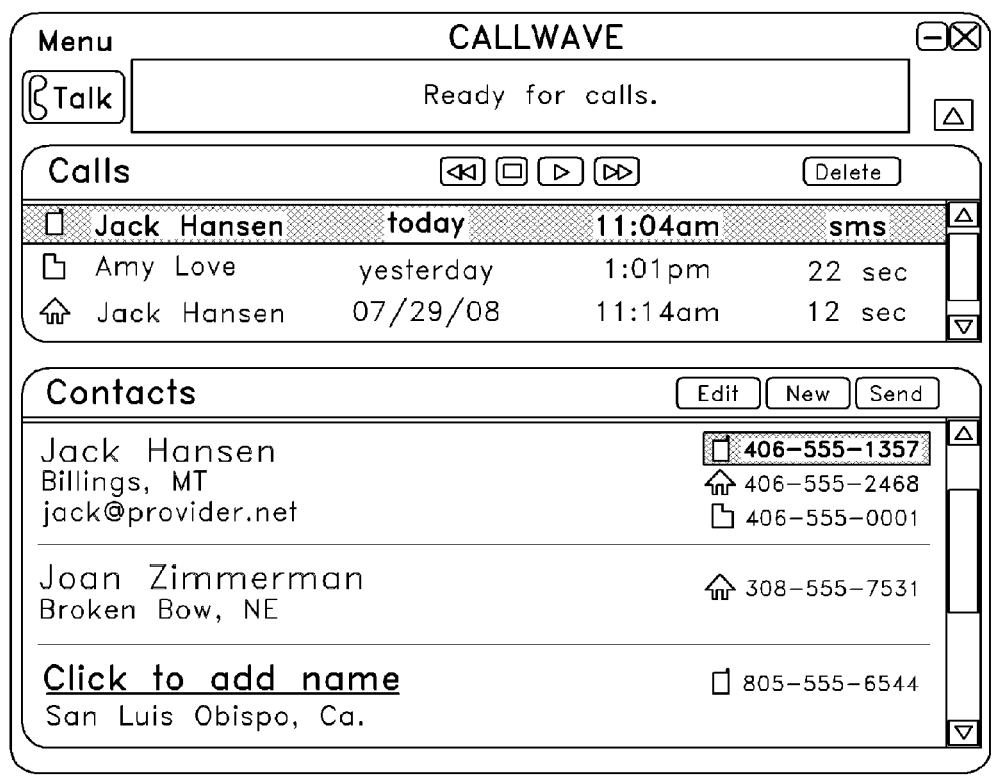
FIG. 2 illustrates a first example telecommunications client call log and user contact interface.
Figure 3:
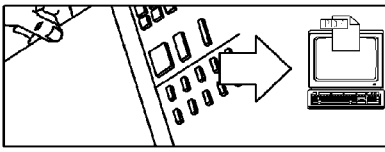
FIG. 3 illustrates a second example Web-based telecommunications client call log and user contact interface.
Figure 4:
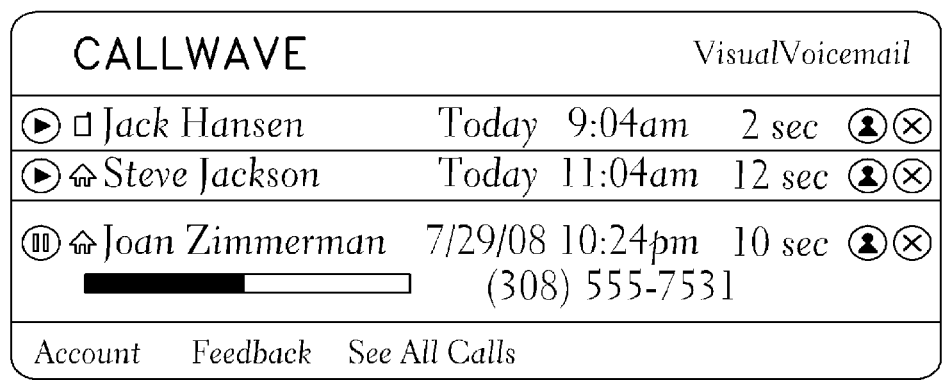
FIG. 4 illustrates a third example Widget-based telecommunications client call log user interface.

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interfaces illustrated in FIG. 2-4). Optionally, a customer can have multiple clients hosted on multiple computers or other hosts.

In an example embodiment, the telecommunications client application (with an interface such as the example illustrated in FIG. 2) connects to and communicates with a call processing system via the Internet, an intranet, or other network. The client application, executing on a subscriber's computer terminal or other host, can make the subscriber's online presence known to the call processing system (e.g., by transmitting a message over the Internet to the call processing system). Optionally, the client can be used to receive, edit, and display call log data from the call processing system (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the call processing system streams a message being left by a caller to the client so that the called party can listen to the message in substantially real time) and to instruct the call processing system to accept calls on the host computer terminal, forward calls, refuse calls, initiate call conferencing, and to otherwise provide call handling instructions. Options are also provided in the client to respond to calls using a text reply option and/or multimedia reply option. In addition, options are provided whereby a user can search their contact database and/or the web.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

A telecommunications client is just an example user interface. FIG. 3 illustrates another example call log user interface presented via a browser to a customer. The browser can be executing on a computer terminal, such as a personal computer, a Wireless Application Protocol (WAP) or browser-enabled phone, a PDA or the like. The call log can be accessed by supplying the appropriate URL to the browser and optionally providing log-on information, such as a user name and a password.

Some or all of the information and functionality provided by the user interfaces discussed can be provided by a widget or a gadget, such as that illustrated in FIG. 4. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

The functionality, operation, and implementation for an example service retaining, organizing, presenting, and responding to calls, messages, other objects will now be described in further detail.

GLOSSARY

AIN—Advanced Intelligent Network
CP—Carrier Partner
IP—Intelligent Peripheral
LMW—Leave Message Widget
MMS—Multimedia message service
MSC—Mobile Switching Center
NANP—North American Numbering Plan
PCM—Pulse Code Modulation Voice Encoding
SCP—Service Control Point
SMPP—Short Message Peer-to-Peer Protocol
SMS—Short Message Service
SS7—Signaling System 7
WIN—Wireless Intelligent Network A Widget can be in the form of code (e.g., HTML code, embedded objects, etc.) that is inserted onto a profile page. The term "State" as used herein may be used herein to refer to a current viewable area (e.g., within a widget) or a process state. The term "page" may be used herein to refer to a page, such as a web page viewable in a browser. The term "page visitor" may be used herein to refer to an individual browsing a web site, such as a user navigating to a web page that contains a widget for leaving a message. The term "page owner" may be used herein to refer to a subscriber having an associated web page (e.g., a subscriber that has verified their account and pasted the code (e.g., HTML code) to embed the widget for leaving a message onto their web page).

The term "link" may be used herein to refer to text, icon, or other object that when clicked on launches content, such as web server content in a browser page.

The term "button" (with respect to the example Widget) may be used herein to refer to an icon, button, text phrase or other object that when clicked results in an action within the widget, and does not launch web content in a browser.

FIG. 1 illustrates an example advanced telecommunications network environment.

A service provider or carrier (e.g., a Carrier Partner) customer may have one or more landline or wireless phones that connect to a local exchange switch, an SSP 112 (Service Switching Point), or MSC 114 (Mobile Switching Center) in the carrier's network. The customer may also have one or more hosts (e.g., personal computers, networked televisions, personal digital assistants, smart phone, etc.) running a telecommunications client 108. In addition, a customer may have one or more phones connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP, Skype/peer-to-peer, or other protocol) to a call routing service provider or other destination.

The example telecommunications client 108 has one or more user interfaces that display some or all of the following: a call log, text messages (including transcribed voice message), a contact record/list, an optional automated character, and active, in-progress calls. The customer can elect to screen or take an active call or respond to a caller with a text message. Optionally, calls can also be made (originated) via the telecommunications client 108 (e.g., where the host is equipped with a speaker and microphone). Optionally, information about a caller can be retrieved through a search function.

In this example, the call processing system 121 has a number of components, some of which are optionally centralized at a given location, others of which may be co-located in the carrier's network (e.g., to reduce network transport costs). An SCP (Service Control Point) is an optional AIN component that interacts with the SSPs 112 (e.g., using the TCAP (Transaction Capabilities Application Part) protocol). AIN triggers are armed for the customer's landline phone number/address/account so that when calls are made to or from that phone, a trigger fires and causes the SSP 112 to query the SCP for instructions on how to handle the call. The SCP is optionally also configured to perform TCAP queries to other SS7 components as needed by some services (e.g., request Automatic Callback from another carrier's switch when a line becomes idle).

In a non-AIN deployment, the call processing system 121 optionally interconnects with the PSTN using, by way of example, SS7 signaling. In this case, in an example embodiment, the SS7 signaling information associated with a call terminates on a Call Controller subsystem or the like, and the trunks (or bearer channels) terminate on one or more call managers 122 (described further below). Optionally instead, the Call Controller subsystem and/or associated functions thereof, are included in the call manager subsystem 122.

In an example VoIP deployment scenario, the call processing system 121 interconnects with the PSTN through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet.

In an example embodiment, SS7 Wireless Intelligent Network (WIN) triggers are set in the mobile switches of Wireless Carrier Partners to provide similar calling services as described herein with respect to a landline phone for a customer's mobile phone number/address/account.

In an example embodiment, the call processing system 121 also contains one or more systems referred to as call managers 122. The call managers 122 are connected to the PSTN (e.g., via ISDN using the ISUP (ISDN User Part) protocol, by way of example, although other protocols can be used). The call managers 122 provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP). The example call manager 122 optionally can also act as an IP (Intelligent Peripheral), another AIN component that the SCP can instruct the SSP 112 to connect into the call for interaction with the called and calling party. The IP/call managers 122 and SCPs in the call processing system 121 optionally share a Call Registry that stores information about active calls.

The session managers 128 in the call processing system 121 optionally track telecommunication client presence and interact with a given telecommunications client (e.g., a client application hosted on a personal computer, PDA, smart phone, or a networked television) as call log, contact, and/or customer data needs to be synchronized with the centralized databases to provide the customer, via the client, with updated log, contact, and/or customer data. The session managers 128 also optionally provide the SCP in an AIN environment and call manager 122 in a non-AIN environment with service configuration information for the customer involved in a call. During an active call, the SCP and/or IP/call manager 122 optionally directly or indirectly interact with the telecommunications client 108 to provide call progress information, and to stream audio and/or visual content.

The call processing system 121 in this example contains centralized databases and/or a general-purpose storage area, optionally including, but not limited to, some or all of the following: a call log database, a contacts database, and a customer database 134. Optionally, the databases are not centralized and may be distributed geographically and/or over different systems. The call log database stores call events and related data for incoming and/or outgoing calls and text and/or multimedia messages. The contacts database stores information and parameters (e.g., names, identifiers, and/or phone numbers/addresses, birthdays, notes, automated characters, etc.) associated with a sender, called, or calling party. The customer database 134 stores information and parameters (e.g., account data and configuration information) associated with subscribers/customers/users.

The call processing system 121 optionally includes other subsystems, such as some or all of the following: a router subsystem, which serves as an interface to the Internet to manage communications between online IP client devices and call processing servers, an SMS server 124 subsystem which serves as a mail relay to transmit and receive SMS and MMS messages, a search engine 136 which can be used to search and sort archived calls, text and voice messages, contacts, and other kinds of phone related objects, a Customer Relationship Management (CRM) system 130 for monitoring and analyzing usage data and promoting new products and services and for providing related information to a operator terminal 146, a web server subsystem 126 to manage a "web site" associated with the call processing system 121 (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

The call processing system 121 optionally includes a voice-to-text converter system which converts voice messages (e.g., voice mail messages) into text, which can then be transmitted to the intended recipient via an email, a web page, a call log entry, or other wise. The call processing system 121 optionally includes different memory stores for information intended for long term storage 142, 144 and for short term storage short term storage 138, 140.

In this example, short term storage 138, 140, and long term storage 142, 144 may include one or more of the foregoing databases. Data stored in the short term storage may be copied or transferred to long term storage 142, 144 after a specified period of time or periodically. The long term storage 142, 144 may include, by way of example, optical storage, magnetic disk drives, and/or tape storage.

One or more visitor phones 100, 101 may be used to receive calls, such as those placed by the call processing system 121 (e.g., so that the visitor to a user Web page can record a message for the owner of a web page), as well as to place calls. The user may have one or more phones 102, 103, which can be used to place calls, receive calls, and access voice messages.

The user interfaces described herein may be provided via widget 104, a Web portal 106, and/or an executable client 108.

An example social networking Widget will now be described. The example social networking user experience described below is provided via an illustrative widget sometimes referred to as a Leave Message Widget (LMW). However, other widget configurations, plugins, or applications can be used as well. For example, certain embodiments utilize a bridged calling widget made available to social networking Web-users. In this case, rather than leaving a message, a social networking user is connected through a bridged or conference call to the page owner. Certain embodiments enable a user to leave a text message and/or a voice message.

By way of further example, certain embodiments utilize a text messaging Widget available to social networking Web-users. In this case, a social networking user can leave a text message which can be optionally transmitted to the page owner. The message can be retrieved by the page owner/user via SMS, MMS, email, a telecommunication client (e.g., via a text log entry), Instant Messaging, and/or Web page (e.g., via a call log entry).

Figure 8A:
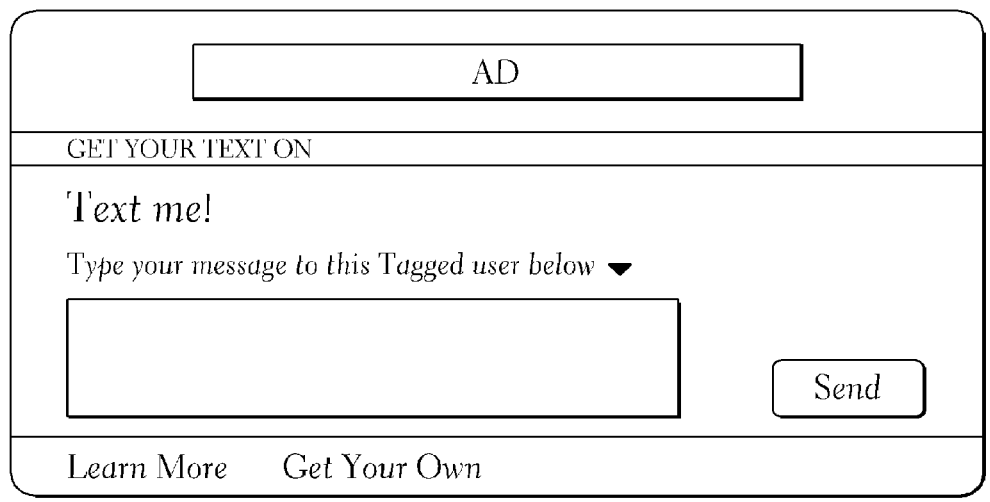

FIG. 8a illustrates an example social networking Text Messaging Widget. This example Widget includes branding for a third party product (e.g., providing advertising). Optionally, the branding can be associated with a service or with a company. The Widget has an optional text field where the user (e.g., a social networking user) can type a message to be transmitted to the Web-page owner. The Widget includes an optional "Send" control which causes the typed message to be transmitted to a page owner's SMS, MMS, email address, etc. The Widget includes an optional "Learn More" link which if selected by the user displays additional information about the Widget functions and/or information about an advertised product or service, or a product or service offered by the sponsor/advertiser. The example Widget also includes an optional "Get Your Own" link which if selected by a user configures a personal Widget for the user, presents Widget code, presents instructions to the user on how to obtain their own Widget, etc.

FIG. 8b illustrates an example Text Messaging Widget in a Registration state. In this example, the Widget requests registration information when a user (e.g., a social networking user) first enters text to be sent to a Web page user. Optionally in this example Widget, subsequent uses of Widget branded with the same advertiser/sponsor will not require re-registration. The Widget in Registration mode optionally includes a link to the Service Provider's terms of service. In this example, the user is optionally requested to enter their mobile phone number for registration. Upon entry of a phone number/address, the Widget will optionally determine the country of origin of the entered phone number. Optionally the user can override the country selected by the Widget. Optionally, the Widget requests the user enter an email address, instant message address and/or other address. Optionally, checking the "Remember me" checkbox will persist the visitor's account information so that on subsequent visits to the Widget, the registration state can be bypassed. Optionally by default the "Remember me" checkbox is checked. If the user selects the "Submit" control the information entered by the user is transmitted to a server over a network for validation and account creation.

Figure 8C:
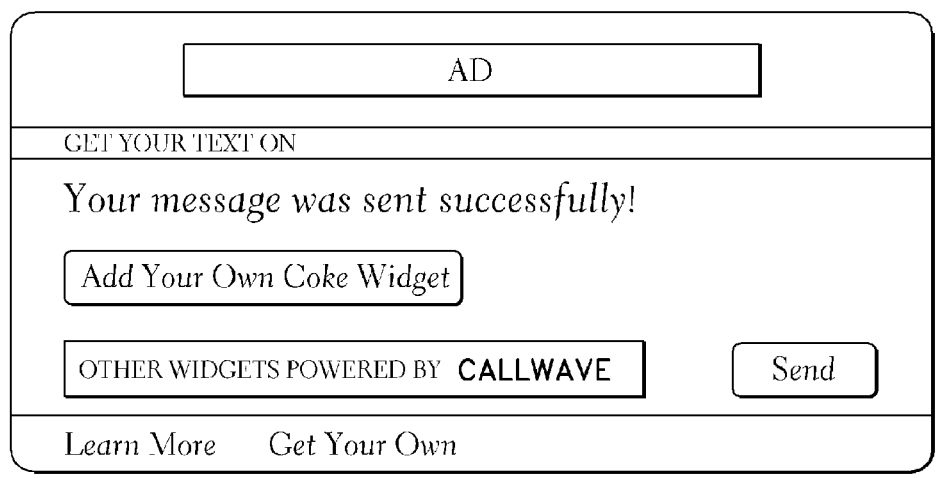

FIG. 8c illustrates an example Text Messaging Widget Confirmation state. In this example, the Widget user successfully completed registration (using the Widget as illustrated in FIG. 8b) or was previously registered and entered text for sending. Optionally, the confirmation state includes an optional "Get Your Own" link which if selected by a user configures a personal Widget for the user, presents Widget code, presents instructions to the user on how to obtain their own Widget, etc. The Widget Confirmation state optionally contains a link to another site. Optionally, the Widget includes links to a "Learn More" which if selected by the user displays additional information about the Widget functions and/or information about a third party product or service.

With respect to a page user/owner's experience and perspective, in an example embodiment the user becomes a Web-page owner through one of the following example methods (although other methods can be used):

Visiting a website and going through a registration process to receive LMW widget code (e.g., in the form of HTML code);

Visiting an LMW widget on someone else's web page and after successfully leaving a message, clicking a link/URL (e.g., "Get Your Own") to display the widget code.

Visiting an LMW widget on someone else's web page and clicking a link/URL (e.g., "Get Your Own") to display the widget code or otherwise accessing the code.

Once the user has the widget code, the user navigates to their web page, and inserts the code into their profile Web page. Optionally, the widget code is automatically inserted into the profile page of the user in response to a user instruction.

When visitors to a user's Web page leave a voice message (e.g. by activating a leave message control presented by the widget, which causes a call processing system 121 to call the visitor's telecommunications device and ask the visitor to record a message, which is then recorded by the call processing system 121), the page owner is notified (e.g., via email, SMS, instant messaging, a call log entry, etc.) of new messages. The page owner can also access their messages using other message retrieval services, for example, telephone (via a voice mail retrieval service), email (e.g., wherein the voice message is attached as an audio file and/or converted to text and embedded in the email or attached as a file), a telecommunication client (e.g., via a call log entry), SMS, MMS, and/or Web page (e.g., via a call log entry).

An example process for adding a widget onto a web page, such as a social networking page follows:

The page owner obtains a Service Provider Account (e.g., associated with the call processing system 121);

The page owner obtains the code (e.g., HTML code) specific to the account (e.g., which has an associated account identifier);

The page owner copies the code (or authorizes the code to be copied) into a web page or social networking profile associated with the page owner;

Or, the page owner selects an option on a social networking Web provider site which automatically configures a Widget on the owner's Web page;

For example, to embed a widget on a social networking profile page (e.g., MySpace, Facebook, etc.), the following example actions can be taken:

The page owner navigates to the social networking website (e.g., www.myspace.com) and logs in;

The page owner clicks an "Edit profile" control to open the main profile edit page;

The page owner pastes the widget HTML code in a text area (e.g., a textarea which is a text-area in an HTML form), such as an "About Me" area;

The page owner clicks a "Save all changes" control then selects a "View my profile" control, and the modified page is displayed to the page owner as visitors would see it.

Optionally, the page owner can disable clickable links in a specific section by inserting a certain string (e.g., "<Z>") into certain textareas.

Figure 5:
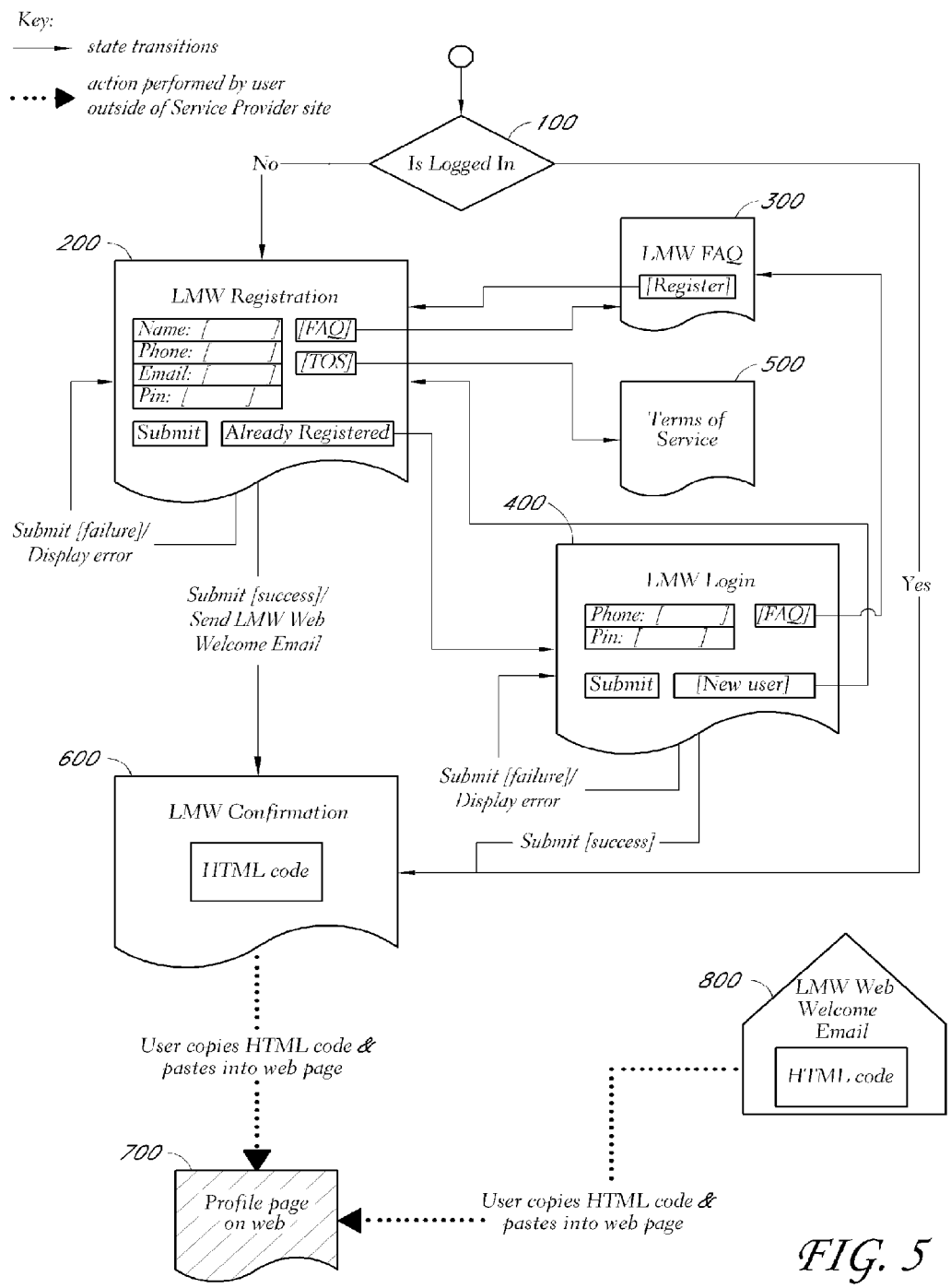
FIG. 5 illustrates an example Web-based Widget registration process.

An example embodiment of the Web flow to create an account which can be used with respect to the message services associated with the Web page/social network profile page is illustrated in FIG. 5. In this example, the user can obtain the HTML "leave message" code to be copied into their page, and instructions explaining how to begin using the widget.

A user browses to a service provider hosted web site in this example.

At state 100, if the user is logged in, control transfers to Web page 600 where a LMW confirmation Web page is displayed, including the HTML code (e.g., where the code is displayed on the Web page itself for copying and/or is accessed via a link to a downloadable file which, when activated, downloads the code to the user's terminal) for use by the user as described above. At state 100, if the user is not logged in, control transitions to a LMW Registration Web page 200.

The LMW Registration Web page 200 optionally requests the user enter some or all of the following: the user's name, phone number(s)/address(es), email address, personal identification code/number and/or password. The phone address(es) are then optionally validated. The following optional example steps to validate a U.S. phone number are applied by the system hosting the registration web page 200, the widget, and/or other system:

1. Strip non-numeric characters
2. If 11 numbers, verify that the format is in the following form: 1+NPANXXYYYY
3. Otherwise determine whether the phone number includes exactly 10 digits
4. Verify that phone number is a valid North American Number Plan number If the phone address entered by the user does not pass verification (e.g., does not include a valid area code, the current number of digits, etc.), the user is informed by a message transmitted by the system (e.g., via a visual and/or audible prompt) to the user terminal informing the user of the error and asking the user to reenter the phone address.

If the phone address is validated and the user selects a "submit" control on the LMW Registration page 200, the system accepts the entered phone name, number/address, email address, password and creates an account and transfers control to another page (e.g., a LMW Confirmation Web page 600). Optionally, if the phone number and/or PIN match a previously registered account (for example, based on a comparison with a database of registered users), an error message is displayed or otherwise provided and the user is optionally requested to reenter their registration information.

The LMW Registration Web page 200 in this example includes a link to an optional Frequently Asked Questions (FAQ) web page 300. Optionally, from the FAQ there is a link back to the LMW Registration page 200. The LMW Registration Web page 200 optionally includes a link to Terms of Service (TOS). The LMW Registration Web page 200 optionally includes a link to an "already registered" authentication Web page 400.

The LMW Login Web page 400 optionally requests a user to enter a phone number/address and password or personal identification number. If the user selects an optional submit control, the system verifies the entered phone number/address and password against a database of registered accounts. If a match is found, control transfers to the LMW Confirmation Web page 600. If no match is found, the system optionally displays an error message and prompts the user to reenter their phone number/address and password. The LMW Login page optionally includes a link to the LMW Registration page 200 as described above. The LMW Login page also optionally includes a new user link which selected transfers control to the LMW Registration page 200.

As discussed above, Widget code is included in the networking profile page 700. For example, the user copies the HTML code displayed in (or downloaded via) web page 600 in their social networking profile page 700. In addition, Web page 600 optionally can include instructions on how to configure a voice mail service. Optionally, page 600 can include instructions on how a user will receive SMS, email, telecommunication client, or other forms of notifications of their voice mail and be able to listen to it.

Optionally, the code (e.g., in HTML) is emailed 800 to the user as part of the registration process, wherein the user can embed the emailed code in one or more Web pages (e.g., Web pages associated with the user).

A voice message left by a visitor (e.g., via the code embedded on a Web page, such as a user's social networking page) is stored on network-based servers. The page owner can access his or her voice mail in one or more ways.

The page owner can use some or all of the following example retrieval methods to access their voice messages:
a call log displayed via a web page;
a telecommunication client;
a visual voice mail widget;
by calling a pilot hunt group, a unique number assigned to their account, and/or an IP address from a telephonic device;
via email (e.g., as an attachment to an email);
via an emailed link to the voice message;
via MMS (e.g., as MMS message sent to their mobile device);

Example functionality from the perspective of a social networking web visitor will now be described. In this example embodiment, the LMW is made up of an object (e.g., a Flash object, a QuickTime object, or other object) surrounded by static code, such as static HTML (see the example illustrated in FIG. 6). The HTML code includes links. In this example there are two links, a link to a LMW Registration process as similarly described in FIG. 5 and a link to a LMW frequently asked questions Web page (other embodiments can include fewer or additional links).

Figure 6:
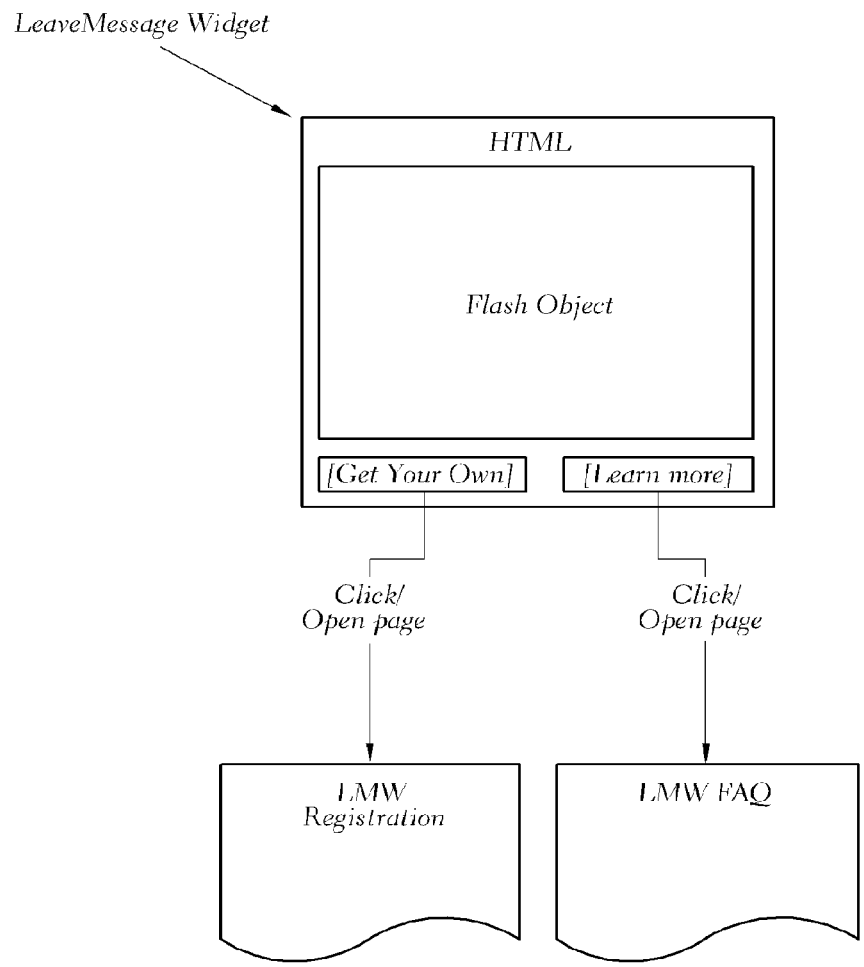
FIG. 6 illustrates an example overview of a Widget via which a message can be left.

The object (e.g., Flash object) of the example LMW illustrated in FIG. 6 will now be described in additional detail. Much of the visitor's interaction is with the object, which is dynamic and communicates with servers optionally hosted by a service provider. The example object (in Flash form) is illustrated in greater detail in FIG. 7.

Figure 7:
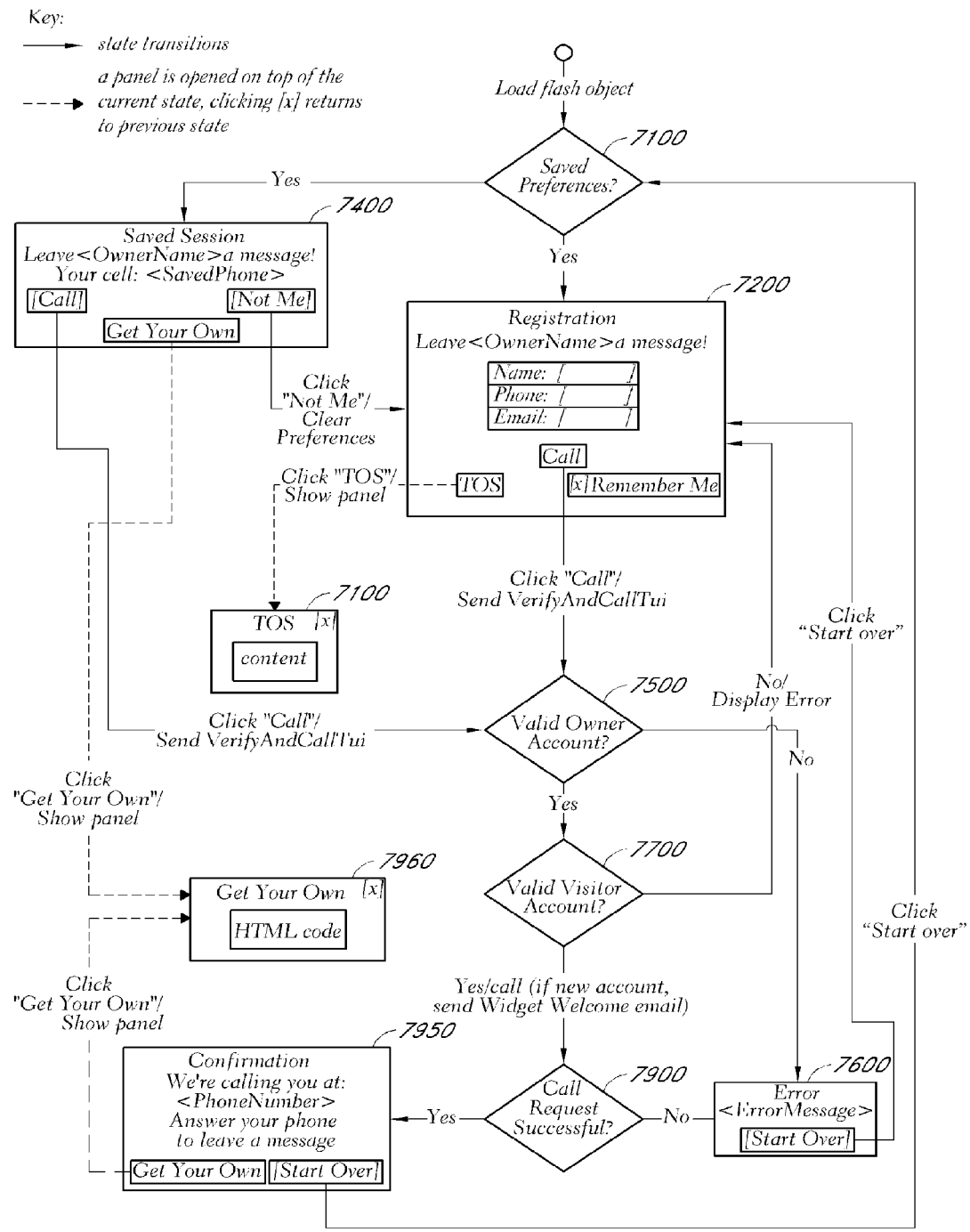
FIG. 7 illustrates an example process for leaving a message via a Widget.

A visitor browsing to a site with a LMW will cause the loading of the Flash object as shown in FIG. 7. If a saved login or other appropriate account identifier/authorizer is not detected at state 100 (e.g., wherein the saved login can be used to identify the visitor and access the visitor's account information), control transitions to a Registration state 200 which optionally collects a visitor's name, phone number/address and email. The Registration state 200 optionally displays a message to the site visitor, for example, "Leave <Owner's Name (or other identification information)> a message (or call, or voice message that will be translated to text and sent to <Owner's Name> cell phone, etc).

Optionally, checking the "Remember me" checkbox will persist the visitor's account information (e.g., on the visitor's terminal for automated future login) so that on subsequent visits to a LMW, the saved session state 400 will be shown instead of the registration state. Optionally by default the "Remember me" checkbox is checked.

Clicking the "TOS" control button optionally displays a panel 7300 with the Service Provider's Terms of Service that sits above whichever state launched it. When the user clicks the "X" in the corner, the panel is closed and the previous state is displayed.

When a visitor selects the optional "Call" control at state 7200, a test is made to determine if the owner account is valid state 7500 (for example, by checking authentication information sent from the client HTML code, such as a page owner identifier code, to a server associated with the call processing system 121 against a customer database 134). If the owner account is invalid, an error message is displayed and control transitions to 7200. If the owner account is valid, control transfers to state 7700.

At state 7700, a test is made to determine if the visitor has entered valid registration information at visitor registration state 7200 (e.g., to establish a valid account, including one or more phone addresses associated with the visitor, and optionally one or more email, SMS, and/or instant messaging addresses). As discussed below, the registration state 7200 can be reached by the visitor activating an appropriate control presented by the widget user interface. An example of the validity determination can include some or all of the following processes:

- a check is made to ensure that phone number is a valid 10 digit, NANP number or an 11 digit number including a valid 10 digit, NANP number and a prefix of "1". The widget optionally uses client side verification for the number of digits in the phone number and the server verifies it is a valid NANP number;
- email verification is optionally performed client side, and additional (or more in-depth) email verification is optionally performed by the server(s).

If the phone number is not previously registered, in this example the following occurs:

- the account is registered and a password is optionally autogenerated. At this point the visitor's information is persisted if "remember me" is checked. The default is to keep the checkbox unchecked; and
- a Widget Registration welcome email is sent to the visitor's email address (other forms of communications, such as SMS messages, MMS messages, instant messaging, etc., can be used as well).

If the phone number is already associated with a registered account, then in an example embodiment:

- The account should not be locked (for example, an account may be locked for fraud, excessive use, too many invalid authenticated logins, etc.);
- Account details are not updated;
- No user validation is done; pin is not required.

Optionally, if the owner of the account and visitor are valid, then the call processing system 121 places a call to visitor's phone number and voice prompts the user to leave a message for the account owner. If the outbound call initiation is successful, control transfers to a confirmation state 7950 which optionally displays a message via the widget or otherwise informing the visitor that the system is calling their phone address (e.g., cell phone address), and that they should answer it to be connected to the page owner's voice mail (for example, "We're calling you at <Phone Number/Address>. Answer your phone to leave a message").

The confirmation state 7950 optionally causes a control button to be displayed which when selected by a visitor displays LMW HTML code at state 7960. The visitor can utilize the code by including the code be used on the visitor's own social networking site. Optionally the LMW will include a generated unique identifier which will be used to identify the visitor. The confirmation state 7950 optionally displays a control button via the widget which when selected by a visitor starts the process over. If the outbound call is unsuccessful, an appropriate error message 7600 optionally is displayed to the user (e.g., indicating that the outbound call was not completed).

If registration is not successful, an error 7600 is shown in a widget status area describing the problem to the user.

If stored login information is found for this widget at state 7100, then the saved session state 7400 is optionally displayed when the widget loads. Optionally a message is displayed (for example, Leave <Owner's Name (or other identification information)> a message (or call, or voice message that will be translated to text and sent to <Owner's Name> cell phone, etc and Your cell: <Saved Phone Number/Address>).

Clicking the "Not me" button takes the visitor to the registration state 7200, which causes a registration form to be presented to the visitor (e.g., asking the visitor to provide information, such as visitor name, phone address, email address, SMS address, etc.). (Optionally, this has the side effect of clearing the stored information.). The visitor information entered by the visitor and received by the call processing system 121 can then be stored in a call processing system 121 database for later access when placing calls to the visitor and/or for providing the visitor with notifications regarding calls or otherwise.

Clicking the "Call" control starts the call request process and control is transferred to state 7500.

Clicking the "Get Your Own" control at state 7950 causes an interface to be displayed (e.g., in the form of a panel, window, pop-up, or otherwise) at state 7960 showing the LMW HTML code for the user to get their own widget, along with instructions for use. Optionally, by way of example and not limitation, in addition or instead, activation of the "Get Your Own" control causes a link to the code to be provided, and/or email with the code or a link to the code to be sent to the visitor. Optionally, the panel is positioned above the state/user interface that launched it. Optionally, the code is configured for the account that just placed the call, whether it is a new registration or the number belongs to an existing account. When the user clicks the "X" in the corner, the panel is closed and the previous state is displayed without changes.

The widget optionally persists only a minimally needed set of account attributes locally as well as a cache of the HTML code. The widget downloads other attributes as needed. This optional design provides flexible support for the following scenarios:

- A visitor with a single account can use multiple widgets on various pages;
- Multiple visitors can share a single computer and each use the widget with their own account. In an example embodiment, this is performed by the user of account a clicking "not me" in the widget, followed by a login of account B in the widget.

Optionally, the LMW widget is automatically updated as needed (e.g., where the user does not have to manually initiate an update request). Since the LMW HTML code references objects that reside on the server, once the server code is updated that portion of the widget is updated for the users.

Message requests and responses (between Widgets and Servers) are optionally sent over a secure HTTPS connection to prevent snooping.

It should be understood that certain variations and modifications of the systems and processes described herein would suggest themselves to one of ordinary skill in the art. The scope of the present invention is not to be limited by the illustrations or the foregoing descriptions thereof.

What is claimed is:

1. A method of providing user communications, the method comprising:
providing an application software program for installation on a mobile computing device associated with a user;
providing, by a computer system comprising a computing device and a network interface, a communication service to a web page of the user;

receiving, at the computer system, from a visitor to the web page of the user a communication request to communicate with the user via a communication interface displayed in association with the web page of the user, the communication interface including a text entry field configured to receive a text message from the visitor for the user;

causing, at least in part by the communication service, at least a first system to transmit a text message entered by the visitor into the text entry field to the application software program, wherein the application software program is installed on the user mobile computing device, without the visitor providing, and without revealing to the visitor, a mobile communication device phone address of the user;

creating a contact record in a contact database accessible by the application software program;

determining by the computer system if the user has a first account; and if the user does not have a first account, requesting that the user provide at least a first type of registration information prior to enabling the application software program to be provided to the user mobile computing device.

2. The method as defined in claim 1, the method further comprising:

providing via the communication interface a voice control; and in response to a visitor selecting the voice control, causing, at least in part by the communication service, a phone call between the visitor and the user to be established without the visitor providing, and without revealing to the visitor, the mobile communication device phone address of the user.

3. The method as defined in claim 1, the method further comprising:

enabling at least one visitor to the user web page to leave a voice message for the user via the communication interface; and providing the user with access to the voice message via the application software program installed on the user mobile computing device.

4. The method as defined in claim 1, the method further comprising:

enabling at least one visitor to the user web page to leave a voice message for the user via the communication interface; and providing the user with access to a textual version of the voice message via the application software program installed on the user mobile computing device.

5. The method as defined in claim 1, the method further comprising enabling the user to search for a contact in the contact database via the application software program installed on the user mobile computing device.

6. The method as defined in claim 1, the method further comprising transmitting to the user mobile computing device via SMS the text entered by the visitor into the text entry field without the visitor providing, and without revealing to the visitor, the mobile communication device phone address of the user.

7. The method as defined in claim 1, the method further comprising notifying the user, via the application software program installed on the user mobile computing device, of the text message transmission.

8. The method as defined in claim 1, the method further comprising notifying the user, via an SMS service, of the text message transmission.

9. The method as defined in claim 1, wherein the application software program is provided via a software download to the mobile communication device of the user.

10. The method as defined in claim 1, wherein the text message is transmitted over the Internet to the application software program installed on the mobile communication device of the user.

11. A method of providing user communications, the method comprising:

providing over a network an application software program for installation on a mobile computing device associated with a user;

providing, by a computer system comprising a computing device and a network interface, a communication service to a web document of the user, wherein the communication service facilitates communications from a visitor to the user web document to the user;

receiving, from a first visitor at the computer system, a communication request to communicate with the user via a communication interface displayed in association with the user web document, the communication interface including a text entry field configured to receive a text message from the first visitor for the user;

causing, at least in part by the communication service, at least a first system to transmit a text message entered by the first visitor into the text entry field to the user mobile computing device, the user mobile computing device having the application software program installed thereon, without the first visitor providing, and without revealing to the first visitor, a mobile communication device phone address of the user;

determining by the computer system if the user has a first account; and if the user does not have a first account, requesting that the user provide at least a first type of registration information prior to enabling the application software program to be installed on the user mobile computing device.

12. The method as defined in claim 11, the method further comprising:

providing via the communication interface a voice control; and in response to a visitor selecting the voice control, causing, at least in part by the communication service, a phone call between the first visitor and the user to be established without the first visitor providing, and without revealing to the first visitor, a mobile communication device phone address of the user.

13. The method as defined in claim 11, the method further comprising:

enabling at least one visitor to the user web document to leave a voice message for the user via the communication interface; and providing the user with access to the voice message via the application software program.

14. The method as defined in claim 11, wherein if a voice message from a visitor is recorded by the communication service, the method further comprising providing the user with access to the a textual version of the voice message via the application software program installed on the user mobile computing device.

15. The method as defined in claim 11, the method further comprising transmitting to the user mobile computing device via SMS the text entered by the first visitor into the text entry field without the first visitor providing, and without revealing to the first visitor, the mobile communication device phone address of the user.

16. The method as defined in claim 11, the method further comprising notifying the user, via the application software program, of the text message transmission.

17. The method as defined in claim 11, the method further comprising notifying the user, via an SMS service, of the text message transmission.

18. The method as defined in claim 11, wherein the application software program is provided via a software download to the mobile communication device of the user.

19. The method as defined in claim 11, wherein the text message is transmitted over the Internet to the application software program installed on the mobile communication device of the user.

20. The method as defined in claim 11, wherein the web document is a web page.

21. A system, comprising:
at least one network-based server comprising hardware;
at least one network interface;
a router subsystem, which serves as an interface to the Internet to manage communications between online IP client devices and the network-based server; and
an SMS server subsystem which serves as a mail relay to transmit and receive at least SMS messages;
non-transitory memory, coupled to the network-based server, that stores instructions that when executed by the network-based server cause, at least in part, the system to perform operations comprising:
providing an application software program for installation on a mobile computing device associated with a user;
providing, via the network interface, a communication service to a web page of the user;
receiving from a visitor to the web page of the user a communication request to communicate with the user via a communication interface displayed in association with the web page of the user, the communication interface including a text entry field configured to receive a text message from the visitor for the user;
causing, at least in part by the communication service, a text message entered by the visitor into the text entry field be transmitted to the application software program, wherein the application software program is installed on the user mobile computing device, without the visitor providing, and without revealing to the visitor, a mobile communication device phone address of the user; and
creating a contact record in a contact database accessible by the application software program.

22. The system as defined in claim 21, the operations further comprising:
enabling at least one visitor to the user web page to leave a voice message for the user via the communication interface; and
providing the user with access to the voice message via the application software program installed on the user mobile computing device.

23. The system as defined in claim 21, the operations further comprising:
enabling at least one visitor to the user web page to leave a voice message for the user via the communication interface; and
providing the user with access to a textual version of the voice message via the application software program installed on the user mobile computing device.

24. A system, comprising:
at least one network-based server comprising hardware;
at least one network interface;
a router subsystem, which serves as an interface to the Internet to manage communications between online IP client devices and the network-based server; and
an SMS server subsystem which serves as a mail relay to transmit and receive at least SMS messages;
non-transitory memory coupled to the at least one computing device that stores instructions that when executed by the at least one computing device cause, at least in part, the system to perform operations comprising:
providing over a network an application software program for installation on a mobile computing device associated with a user;
providing a communication service to a web document of the user, wherein the communication service facilitates communications from a visitor to the user web document to the user;
receiving from a first visitor a communication request to communicate with the user via a communication interface displayed in association with the user web document, the communication interface including a text entry field configured to receive a text message from the first visitor for the user; and
causing, at least in part by the communication service, to transmit a text message entered by the first visitor into the text entry field to the user mobile computing device, the user mobile computing device having the application software program installed thereon, without the first visitor providing, and without revealing to the first visitor, a mobile communication device phone address of the user.

25. The system as defined in claim 24, further comprising:
a router subsystem; and
an SMS message relay server subsystem.

26. The system as defined in claim 24, the operations further comprising:
enabling at least one visitor to the user web document to leave a voice message for the user via the communication interface; and
providing the user with access to the voice message via the application software program installed on the user mobile computing device.

27. The system as defined in claim 24, the operations further comprising:
enabling at least one visitor to the user web document to leave a voice message for the user via the communication interface; and
providing the user with access to a textual version of the voice message via the application software program installed on the user mobile computing device.

* * * * *

UNITED STATES PATENT AND TRADEMARK OFFICE
CERTIFICATE OF CORRECTION

PATENT NO. : 8,745,148 B1  Page 1 of 1
APPLICATION NO. : 14/073225
DATED : June 3, 2014
INVENTOR(S) : Daniel D'Agruma It is certified that error appears in the above-identified patent and that said Letters Patent is hereby corrected as shown below:

In the Drawings

Sheet 5 of 10 (Reference Numeral 600, FIG. 5) at line 2, Change " *IITML* " to --HTML--.

Sheet 7 of 10 (FIG. 7) at line 2, Change " *state transitions* " to --*state transitions*--.

In the Specification

In column 8 at line 39, Change "other wise." to --otherwise.--.

In column 9 at line 55, Change "a an" to --an--.

In column 11 at line 24, Change "number" to --number.--.

In column 14 at line 43, Change "embodiment," to --embedment,--.

In the Claims

In column 16 at line 59, In Claim 14, change "the a" to --a--.

Signed and Sealed this
Ninth Day of December, 2014

Michelle K. Lee
*Deputy Director of the United States Patent and Trademark Office*